(12) United States Patent
Bagepalli et al.

(10) Patent No.: US 8,094,560 B2
(45) Date of Patent: Jan. 10, 2012

(54) MULTI-STAGE MULTI-CORE PROCESSING OF NETWORK PACKETS

(75) Inventors: Nagaraj Bagepalli, San Jose, CA (US); Abhijit Patra, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 313 days.

(21) Appl. No.: 12/123,223

(22) Filed: May 19, 2008

(65) Prior Publication Data

US 2009/0285228 A1    Nov. 19, 2009

(51) Int. Cl.
*H04L 12/28* (2006.01)
*H04L 12/56* (2006.01)

(52) U.S. Cl. ........................ 370/235; 370/388

(58) Field of Classification Search ............. None
See application file for complete search history.

(56) References Cited

U.S. PATENT DOCUMENTS

| | | | |
|---|---|---|---|
| 5,706,429 A | 1/1998 | Lai et al. | |
| 6,131,120 A | 10/2000 | Reid | |
| 6,205,480 B1 | 3/2001 | Broadhurst et al. | |
| 6,223,217 B1 | 4/2001 | Pettus | |
| 6,460,141 B1 | 10/2002 | Olden | |
| 6,594,712 B1 | 7/2003 | Pettey et al. | |
| 6,640,238 B1 | 10/2003 | Bowman-Amuah | |
| 6,658,469 B1 | 12/2003 | Massa et al. | |
| 6,675,200 B1 | 1/2004 | Cheriton et al. | |
| 6,728,884 B1 | 4/2004 | Lim | |
| 6,754,829 B1 | 6/2004 | Butt et al. | |
| 6,804,720 B1 | 10/2004 | Vilander et al. | |
| 6,889,294 B1 | 5/2005 | Nichols et al. | |
| 6,901,491 B2 | 5/2005 | Kohn et al. | |
| 6,912,604 B1 | 6/2005 | Tzeng et al. | |
| 6,922,724 B1 | 7/2005 | Freeman et al. | |
| 6,947,984 B2 | 9/2005 | Schweitzer et al. | |
| 6,986,040 B1 | 1/2006 | Kramer et al. | |
| 6,999,462 B1 | 2/2006 | Acharya | |
| 7,010,807 B1 | 3/2006 | Yanovsky | |
| 7,051,126 B1 | 5/2006 | Franklin | |
| 7,088,727 B1 | 8/2006 | Short et al. | |
| 7,100,200 B2 | 8/2006 | Pope et al. | |
| 7,114,096 B2 | 9/2006 | Freimuth et al. | |
| 7,114,180 B1 | 9/2006 | DeCaprio | |
| 7,117,526 B1 | 10/2006 | Short | |
| 7,146,635 B2 | 12/2006 | Eggebraaten et al. | |
| 7,149,808 B2 | 12/2006 | Lu | |

(Continued)

FOREIGN PATENT DOCUMENTS

WO        03104943 A2    12/2003

(Continued)

*Primary Examiner* — Gregory Sefcheck
*Assistant Examiner* — Ashley Shivers

(57) ABSTRACT

Techniques for multi-stage multi-core processing of network packets are described herein. In one embodiment, work units are received within a network element, each work unit representing a packet of different flows to be processed in multiple processing stages. Each work unit is identified by a work unit identifier that uniquely identifies a flow in which the associated packet belongs and a processing stage that the associated packet is to be processed. The work units are then dispatched to multiple core logic, such that packets of different flows can be processed concurrently by multiple core logic and packets of an identical flow in different processing stages can be processed concurrently by multiple core logic, in order to determine whether the packets should be transmitted to one or more application servers of a datacenter. Other methods and apparatuses are also described.

26 Claims, 15 Drawing Sheets

U.S. PATENT DOCUMENTS

| | | |
|---|---|---|
| 7,149,817 B2 | 12/2006 | Pettey |
| 7,149,819 B2 | 12/2006 | Pettey |
| 7,149,892 B2 | 12/2006 | Freed et al. |
| 7,171,681 B1 | 1/2007 | Duncan et al. |
| 7,177,277 B2 | 2/2007 | Koponen et al. |
| 7,178,163 B2 | 2/2007 | Reeves, Jr. |
| 7,184,445 B2 | 2/2007 | Gupta et al. |
| 7,185,192 B1 | 2/2007 | Kahn |
| 7,185,361 B1 | 2/2007 | Ashoff et al. |
| 7,185,364 B2 | 2/2007 | Knouse et al. |
| 7,194,554 B1 | 3/2007 | Short et al. |
| 7,197,556 B1 | 3/2007 | Short et al. |
| 7,209,478 B2 | 4/2007 | Rojas et al. |
| 7,209,970 B1 | 4/2007 | Everson et al. |
| 7,209,977 B2 | 4/2007 | Acharya et al. |
| 7,216,152 B2 | 5/2007 | Short et al. |
| 7,216,225 B2 | 5/2007 | Haviv et al. |
| 7,225,364 B2 | 5/2007 | Carnevale et al. |
| 7,228,412 B2 | 6/2007 | Freed et al. |
| 7,308,101 B2 | 12/2007 | Wing |
| 7,633,955 B1 | 12/2009 | Saraiya et al. |
| 7,664,110 B1 | 2/2010 | Lovett et al. |
| 2002/0107971 A1 | 8/2002 | Bailey et al. |
| 2002/0129271 A1 | 9/2002 | Stanaway, Jr. et al. |
| 2002/0199006 A1 | 12/2002 | Magnussen et al. |
| 2003/0005073 A1 | 1/2003 | Yoshizawa et al. |
| 2003/0014544 A1 | 1/2003 | Pettey |
| 2003/0043794 A1 | 3/2003 | Cayton et al. |
| 2003/0097454 A1 | 5/2003 | Yamakawa et al. |
| 2003/0097518 A1 | 5/2003 | Kohn et al. |
| 2004/0010545 A1 | 1/2004 | Pandya |
| 2004/0010612 A1 | 1/2004 | Pandya |
| 2004/0030757 A1 | 2/2004 | Pandya |
| 2004/0030770 A1 | 2/2004 | Pandya |
| 2004/0030806 A1 | 2/2004 | Pandya |
| 2004/0037299 A1 | 2/2004 | Pandya |
| 2004/0037319 A1 | 2/2004 | Pandya |
| 2004/0128538 A1 | 7/2004 | Gmuender et al. |
| 2004/0139319 A1 | 7/2004 | Favazza et al. |
| 2004/0165588 A1 | 8/2004 | Pandya |
| 2004/0210320 A1 | 10/2004 | Pandya |
| 2004/0213284 A1 | 10/2004 | Clarke et al. |
| 2005/0076166 A1 | 4/2005 | Shearer |
| 2005/0108518 A1 | 5/2005 | Pandya |
| 2005/0147039 A1 | 7/2005 | Biran et al. |
| 2005/0188212 A1 | 8/2005 | Laferriere et al. |
| 2005/0238035 A1 | 10/2005 | Riley |
| 2005/0286513 A1 | 12/2005 | King |
| 2006/0045099 A1 | 3/2006 | Chang et al. |
| 2006/0047771 A1 | 3/2006 | Blackmore et al. |
| 2006/0056406 A1* | 3/2006 | Bouchard et al. ............. 370/389 |
| 2006/0067346 A1 | 3/2006 | Tucker et al. |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075057 A1 | 4/2006 | Gildea et al. |
| 2006/0075114 A1 | 4/2006 | Panasyuk et al. |
| 2006/0075132 A1 | 4/2006 | Liu |
| 2006/0075463 A1 | 4/2006 | Braddy et al. |
| 2006/0077989 A1 | 4/2006 | Lu et al. |
| 2006/0087989 A1 | 4/2006 | Gai et al. |
| 2006/0095334 A1 | 5/2006 | Simmons |
| 2006/0101225 A1 | 5/2006 | Aloni et al. |
| 2006/0123481 A1 | 6/2006 | Bhatnagar et al. |
| 2006/0126628 A1* | 6/2006 | Li et al. ..................... 370/392 |
| 2006/0136570 A1 | 6/2006 | Pandya |
| 2006/0168274 A1 | 7/2006 | Aloni et al. |
| 2006/0174104 A1 | 8/2006 | Crichton et al. |
| 2006/0200477 A1 | 9/2006 | Barrenechea |
| 2006/0230119 A1 | 10/2006 | Hausauer et al. |
| 2006/0233101 A1 | 10/2006 | Luft et al. |
| 2006/0236063 A1 | 10/2006 | Hausauer et al. |
| 2006/0236385 A1 | 10/2006 | Innes et al. |
| 2006/0259661 A1 | 11/2006 | Feng et al. |
| 2006/0262782 A1 | 11/2006 | Biran et al. |
| 2006/0262796 A1 | 11/2006 | Biran et al. |
| 2006/0262797 A1 | 11/2006 | Biran et al. |
| 2006/0262799 A1 | 11/2006 | Biran et al. |
| 2006/0268866 A1 | 11/2006 | Lok |
| 2006/0291803 A1 | 12/2006 | Watson et al. |
| 2007/0002769 A1 | 1/2007 | Matityahu et al. |
| 2007/0005801 A1 | 1/2007 | Kumar et al. |
| 2007/0067638 A1 | 3/2007 | Haibl et al. |
| 2007/0073966 A1 | 3/2007 | Corbin |
| 2007/0121615 A1 | 5/2007 | Weill et al. |
| 2007/0130167 A1 | 6/2007 | Day et al. |
| 2007/0153798 A1 | 7/2007 | Krstulich |
| 2007/0160072 A1 | 7/2007 | Thalanany et al. |
| 2007/0160073 A1 | 7/2007 | Toumura et al. |
| 2007/0165672 A1 | 7/2007 | Keels et al. |
| 2007/0171921 A1 | 7/2007 | Wookey et al. |
| 2007/0174429 A1 | 7/2007 | Mazzaferri et al. |
| 2007/0179955 A1 | 8/2007 | Croft et al. |
| 2007/0180088 A1 | 8/2007 | Zhao |
| 2007/0180447 A1 | 8/2007 | Mazzaferri et al. |
| 2007/0180493 A1 | 8/2007 | Croft et al. |
| 2007/0226750 A1 | 9/2007 | Sharp et al. |
| 2008/0031265 A1* | 2/2008 | Mullick et al. ............. 370/401 |

FOREIGN PATENT DOCUMENTS

| | | |
|---|---|---|
| WO | 2005081855 A2 | 9/2005 |
| WO | 2005104443 A2 | 11/2005 |
| WO | 2006031496 A2 | 3/2006 |
| WO | 2006113722 A2 | 10/2006 |

* cited by examiner

```
int main (int argc, char *argv[])
{
    /* Set the model to stage scheduling */
    mcs_set_attr(SCHED_MODEL, STAGE_SCHEDULING);

/* Initialize the stages S1 and S2 */
    init_app_s1();
    init_app_s2();

mcs_wait_for_events();      /* Be in main loop waiting for events */ return 0;
}
```

FIG. 10A

```
int init_app_s1 (void)
{
    mcs_map_stage_to_group(S1, G1);
    mcs_set_callback(S1, app_s1_callback);
} int app_s1_callback (mcs_tag_t tag,
                     mcs_event_t *ev_p)
{
    s1_context_t *s1_cont_p;

s1_cont_p = (s1_context_t *)ev_p->app_spec;
    assert(tag.stage_id == S1);
    s1_conn = s1_get_conn(tag,tag_value);

/* Handle the event based on ev_p */
    switch (s1_cont_p->opcode) {
        case OPEN:
            /* Handle open */
            break;
        ......
    }

/* format the new event to be sent to s2 */
    tag.stage_id = S2;
    tag.tag_value = s2_specific_tag;

/* Set ev_p to have S2 context */

/* Send the event to S2 using MCS */
    mcs_send_and_deschedule(tag, ev_p);
}
```

FIG. 10B

```
int init_app_s2 (void)
{
    mcs_map_stage_to_group(S2, G2);
    mcs_set_callback(S2, app_s2_callback);
} int app_s2_callback (mcs_tag_t tag,
                     mcs_event_t *ev_p)
{
    s2_context_t *s2_cont_p;

s2_cont_p = (s2_context_t *)ev_p->app_spec;
    assert(tag.stage_id == S2);
    s2_conn = s2_get_conn(tag,tag_value);

/* Handle the event based on ev_p */
    switch (s2_cont_p->opcode) {
    case OPEN:
        /* Handle open */
        break;
        ........
    }

/* No more stages, deschedule the event */
    mcs_deschedule_event(ev_p);
}
```

MULTI-STAGE MULTI-CORE PROCESSING OF NETWORK PACKETS

FIELD OF THE INVENTION

The present invention relates generally to processing network packets. More particularly, this invention relates to multi-core multi-stage network packet processing.

BACKGROUND

Typically, any execution of network application can be divided into multiple stages of processing. For e.g. a web server processing can be broken down into following different stages:
- Layer 2, Layer 3 and flow processing
- TCP protocol stack processing
- SSL protocol stack processing
- HTTP protocol stack processing
- Application written on top of HTTP protocol Typically, an application itself could be divided into multiple stages depending on the functionality. Basically, each stage is a well contained function and it should provide a well defined API. When a packet enters the system, it goes through different stages of processing one after another. Some sort of communication mechanism need to be implemented for inter-stage communication. With the multiple cores available to execute an application, different models of execution are possible by distributing the processing of stages in different ways.

In a pipeline execution model as shown in FIG. 1A, each core will be dedicated to perform one of the stages in the application processing. Here $P_n$ is the $n^{th}$ packet, $F_m$ is the $m^{th}$ flow and $S_k$ is the $k^{th}$ stage. In order to perform all the required functions of all stages, the packet will traverse from one core to another core. This model works best under the following conditions:
- Every stage performs equal amount of processing
- The number of stages is equal to the number of processing cores.

It is uncommon that an application can be divided into stages which require the same processing capability. If all the stages are not equal, the performance of the function will be limited by the weakest stage in the pipeline. In order to balance the stage processing and utilize all the cores, it may be required to perform the same function in multiple cores.

In a parallel execution model as shown in FIG. 1B, all the stages of the application processing is replicated in all the cores of SOC and the traffic is load balanced so that all the cores are utilized efficiently. In order to load balance the traffic, either couple of cores need to be dedicated for this purpose or introduce one more stage to load balance the traffic. Also, application states need to be managed in the shared memory if any packet can be sent to any core.

Challenge with this scheme is to load balance the traffic efficiently without breaking the application semantics. For example, if multiple cores of a system chip (e.g., system-on-chip or SOC) are being used for providing TCP termination functionality, the load balancer needs to follow the event ordering (i.e. if a core is working on a TCP segment for a given connection, no other core should work on any event of the same TCP connection). A typical way to solve this TCP ordering and connection atomicity problem is to use some kind of a hash to dispatch the packets so that packets of a given connection will always end up with the same core there by creating an implicit execution order. Using the hash may create an imbalance and some of the cores may be underutilized.

SUMMARY OF THE DESCRIPTION

Techniques for multi-stage multi-core processing of network packets are described herein. In one embodiment, work units are received within a network element, each work unit representing a packet of different flows to be processed in multiple processing stages. Each work unit is identified by a work unit identifier that uniquely identifies a flow in which the associated packet belongs and a processing stage that the associated packet is to be processed. The work units are then dispatched to multiple core logic, such that packets of different flows can be processed concurrently by multiple core logic and packets of an identical flow in different processing stages can be processed concurrently by multiple core logic, in order to determine whether the packets should be transmitted to one or more application servers of a datacenter.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 10A-10C are pseudo code illustrating a process performed by multi-core scheduling processes according to certain embodiments.

DETAILED DESCRIPTION

Techniques for multi-stage multi-core processing of network packets are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Accordingly, certain unique multi-core multi-stage core processing models of network packets are designed to improve the efficiency of the packet processing. In general, one of the goals of multi-core multi-stage processing is to make sure all the cores are utilized equally and efficiently (e.g., there should not be any imbalance in the processing performed by the cores), to minimize the locking that needs to be performed by the application, and to maintain the atomicity and serialization of the TCP byte stream semantics. For example, when a TCP proxy in one core is processing a TCP segment for a given connection, it should be assured that no other core is processing any TCP event for the same connection.

According to certain embodiments, network packets are categorized into work units by a packet order work (POW) unit. Each work unit is identified by an identifier (also referred to as a work unit identifier or packet identifier), which uniquely identifies an associated packet (as a payload of the respective work unit) a network flow and processing stage in which the packet belongs. In addition, a multi-core scheduling (MCS) unit, which may include software, hardware, or a combination of both, is employed to dispatch the work units to multiple core logic of a network element such that packets of different flows can be processed substantially concurrently by multiple core logic. Further, the work units may be dispatched to multiple core logic of the network element such that packets of the same flow in different stages may be processed substantially concurrently by multiple core logic.

Figure 1A:
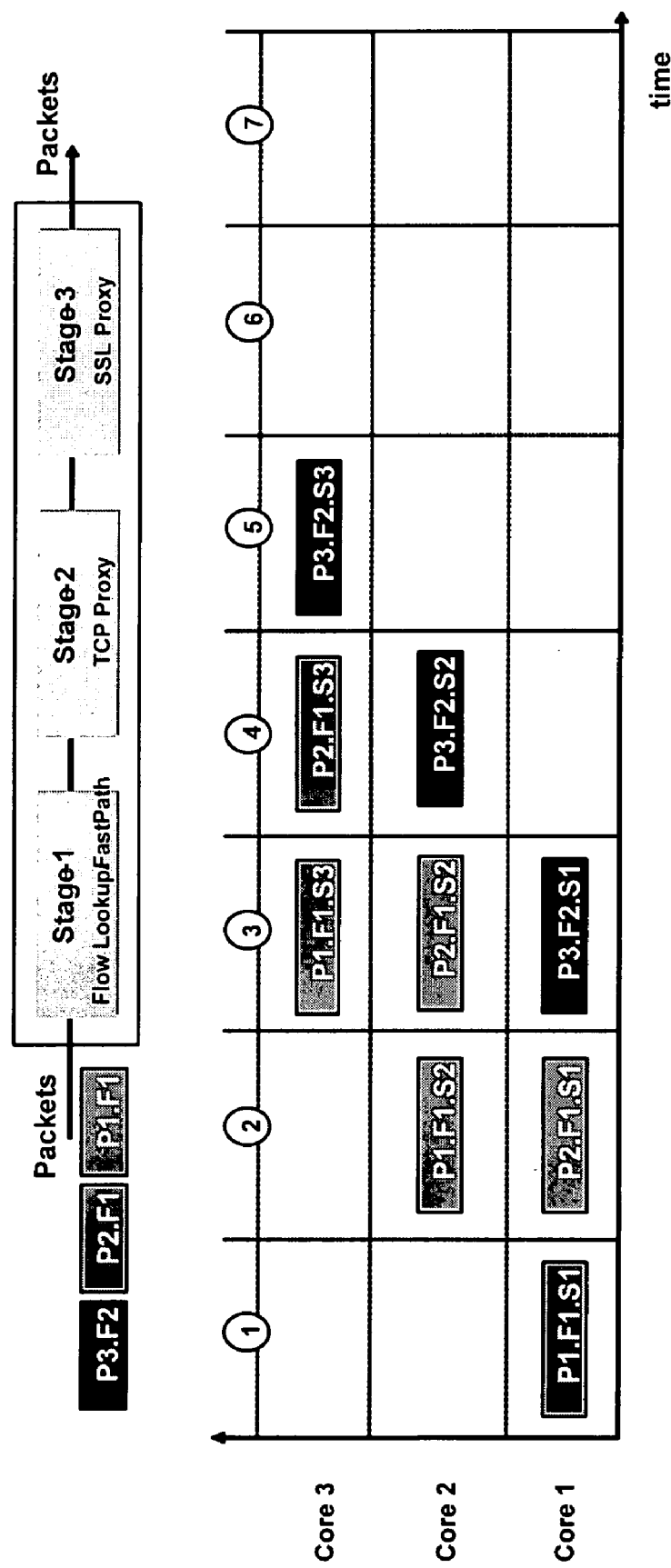
FIGS. 1A-1B are diagrams illustrating typical multi-processing of network packets.
Figure 1B:
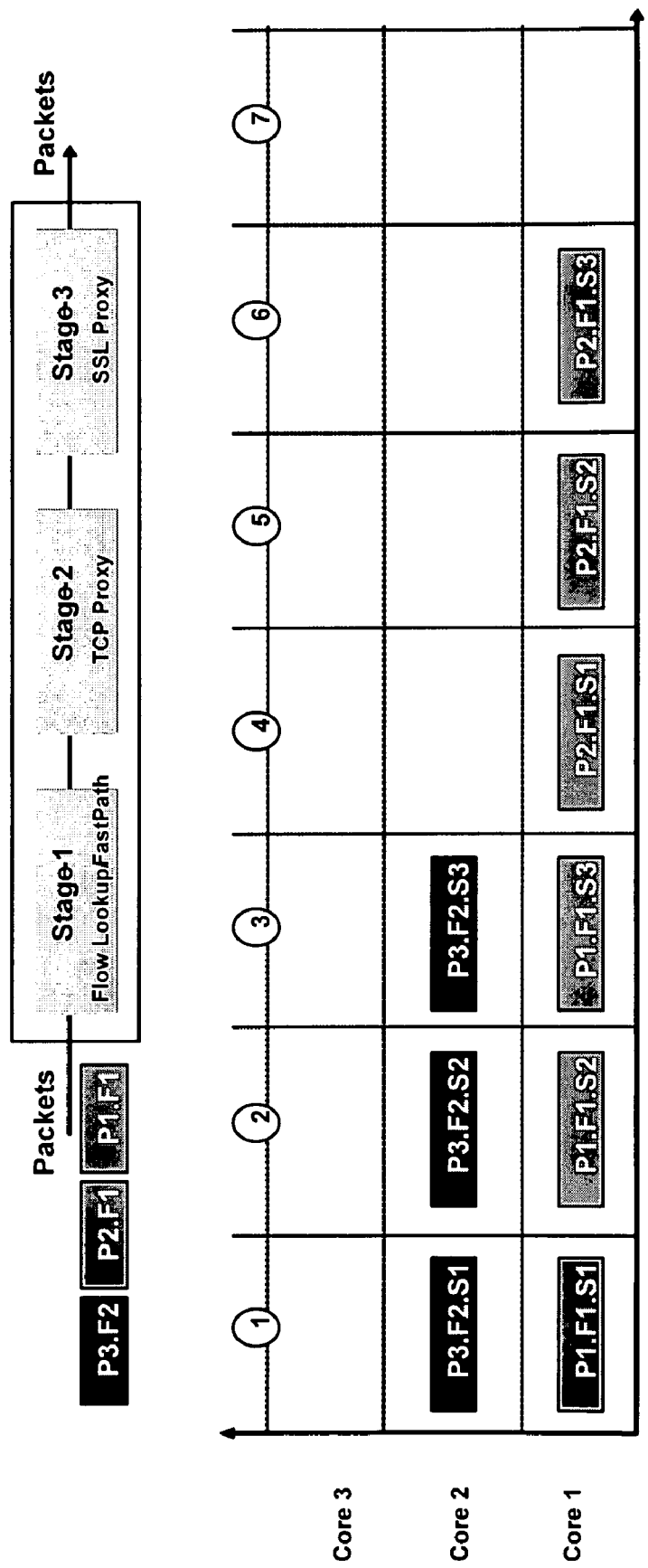
Figure 2:
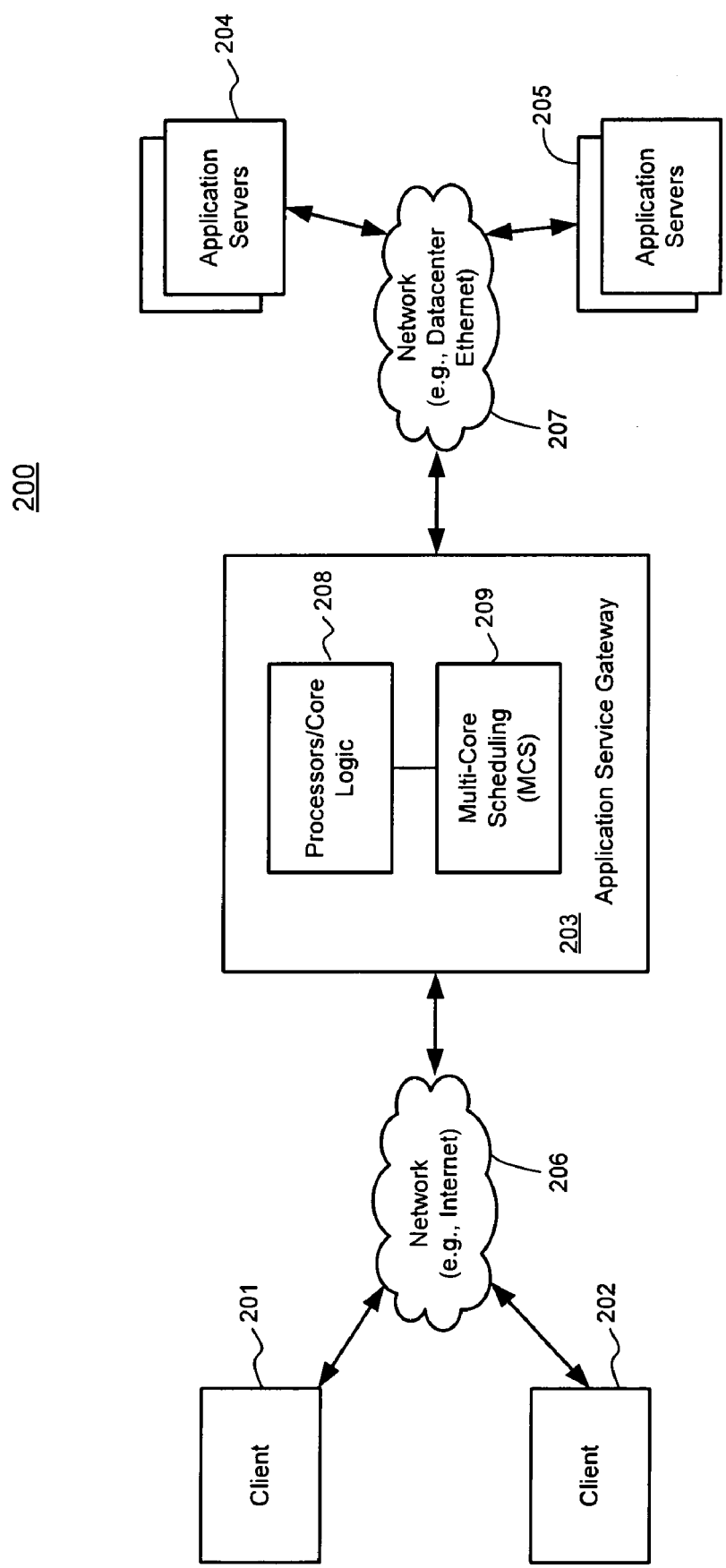
FIG. 2 is a block diagram illustrating an example of a network configuration according to one embodiment of the invention.

FIG. 2 is a block diagram illustrating an example of a network configuration according to one embodiment of the invention. Referring to FIG. 2, network configuration 200 includes one or more clients 201-202 communicatively coupled to an application service gateway or appliance device 203 in order to access one or more application servers 204-205 of a datacenter over networks 206-207. In order to access applications provided by application servers 204-205, each of the clients 201-202 has to go through application service appliance 203 over networks 206-207. Network 206 may be a local area network (LAN) or a wide area network (WAN). Alternatively, network 206 may be an internal network of an entity such as intranet. Network 207 may be a converged fabric network such as a datacenter Ethernet (DCE) or InfiniBand™ network.

According to one embodiment, device 203 is configured to perform attribute based authentication and/or authorization of clients 201-202 to determine whether a particular client is eligible to access application servers 204-205. In one embodiment, device 203 includes multiple processors or core logic 208 which can be used to process network packets in various ways based on one or more policies. Processors/core logic 208 may be configured to process any of layer 2 to layer 7 of OSI (open system interconnect) network layers of processes. For example, one processor/core may be configured to process layer 2 to layer 5 while another processor/core may be configure to process layer 5 to layer 7, etc. In one embodiment processors/core logic 208 may be implemented using an Octeon™ compatible processor available from Cavium Networks of Mountain View, Calif.

Application service appliance 203 further includes a multi-core scheduling (MCS) module 209 which may be implemented as software (e.g., abstract software layer), hardware (e.g., POW unit), or a combination of both. In one embodiment, network packets are categorized into work units by a POW (not shown) which may be implemented as part of MCS 209. Each work unit is identified by an identifier (also referred to as a work unit identifier or packet identifier), which uniquely identifies an associated packet (as a payload of the respective work unit) a network flow and processing stage in which the packet belongs. In addition, MCS 209 is configured to dispatch the work units to multiple core logic 208 of a network element 203 such that packets of different flows can be processed substantially concurrently by multiple core logic. Further, the work units may be dispatched to multiple core logic of the network element such that packets of the same flow in different stages may be processed substantially concurrently by multiple core logic.

Note that network configuration 200 is shown for illustration purposes only. For example, networks 206-207 may be the same network or different networks. Other configurations may exist.

Figure 3A:
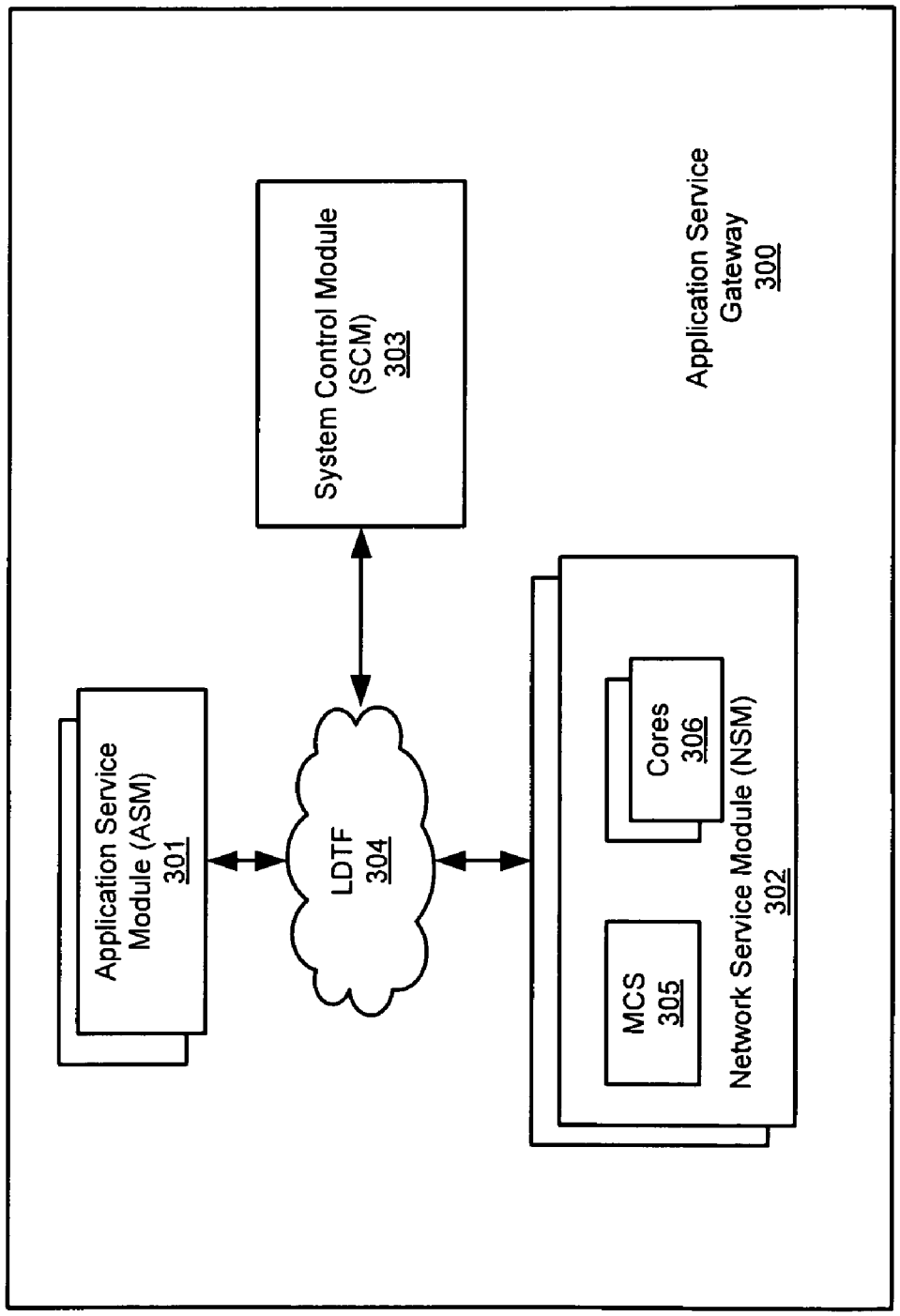
FIGS. 3A and 3B are block diagrams illustrating an example of an application service appliance or gateway according to certain embodiments.

FIG. 3A is a block diagram illustrating an example of an application service appliance or gateway according to one embodiment. For example, device 300 may be implemented as part of application service appliance 203 of FIG. 2. Referring to FIG. 3A, application service appliance 300 includes, but is not limited to, one or more application service modules (ASMs) 301 (also referred to as an application service plane) communicatively coupled to one or more network service modules (NSMs) 302 (also referred to as a network service plane) over a lossless switch fabric 304 (also referred to as a lossless data transport fabric or LDTF), which may be an InfiniBand™ compatible switch fabric. In addition, application service appliance 300 includes a system control module (SCM) 303 (also referred to as a management plane) coupled to the LDTF 304 for managing the ASMs 301 and NSMs 302.

ASMs 301 are configured to perform layer 4 to layer 7 access control based on attribute-based policies, including performing triangulated authorization based on various attributes, including user attributes, network attributes, environment attributes, and/or resource attributes, etc. An NSM includes one or more network service processor (NSP) and an ASM includes one or more application service processors (ASP).

According to one embodiment, application service appliance 300 is essentially a high-speed full-proxy device and it needs to terminate both client and server ends of a client to server connection. In effect application service appliance 300 acts as a virtual server to actual clients (e.g., clients 201-202 of FIG. 2), and a virtual client to actual servers (e.g., servers 204-205 of FIG. 2). Also, application service appliance 300 is configured to scale in order to be able to process a significant portion of the traffic passing through. This highly-scalable L7 processing bandwidth is a unique differentiator for application service appliance 300, as opposed to existing L4-L7 devices, as they expect the bulk of the traffic processing through the device to be unexamined and unchanged, hence can use a high-speed flow-switching fast path to achieve the target throughput.

According to one embodiment, SCM 303 is responsible for common system management functions as well as configuration and management of processing elements in network and application plane. The SCM 303 includes a low-end processor (also referred to as a management service processor) and has an additional out-of-band connectivity to processing elements on ASMs 301 and NSMs 302. Typically, image download, configuration information, statistic collection messages are exchanged between SCM 303 and rest of the system.

In one embodiment, NSM 302 is responsible for ingress and egress processing of external data path, IP stack for virtual interface, TCP and SSL termination, fast path flow switching, byte stream load balancing among multiple ASMs, and stream replication to a backup NSM, etc. ASM 301 is responsible for protocol proxy such as HTTP, CIFS, JDBC, etc. ASM 301 may include a protocol recognition engine, regular expression engine, rule engine, and application authorization engine, etc.

According to one embodiment, NSM 302 includes an MCS 305 (which may include a POW unit therein) and multiple processors or core logic 306. MCS 305 is configured to dispatch work units to different core logic 306 to enhance the processing efficiency of the network packets, such that packets of different flows can be processed substantially concurrently by multiple core logic 306 or alternatively, packets of the same flow in different stages may be processed substantially concurrently by multiple core logic 306.

Multiple cores are used to satisfy the scalability and performance requirement. There are a couple of ways to use the multiple cores available. One is to divide an application into different processing units and dedicate each core for a different processing unit. This works well as long as the processing can be divided equally among the available cores. In reality, it is very tough to partition the application into such equal units. The other one is to run the same application on multiple cores so that events can be processed by any core as long as the control structure memory is shared across all the cores. Enough care should be taken not to schedule the events which can create inconsistency. For example, if one core is processing a TCP event for a given connection, no event related to that particular connection should be scheduled on any other core. Connection structure should be locked when an event, corresponding to that connection, is being processed by a core.

The software architecture of application service appliance 300 employs the combination of both these approaches for providing a L7 service. For example, TCP/SSL function is performed on one set of cores and then application processing is performed on another set of cores. Cores running application are equally capable and any available core can be used for application processing. Note that core logic 306 may be implemented as part of multiple processors, where each processor may include multiple cores or alternatively, core logic 306 may be implemented as part of a single processor having multiple cores.

Figure 3B:
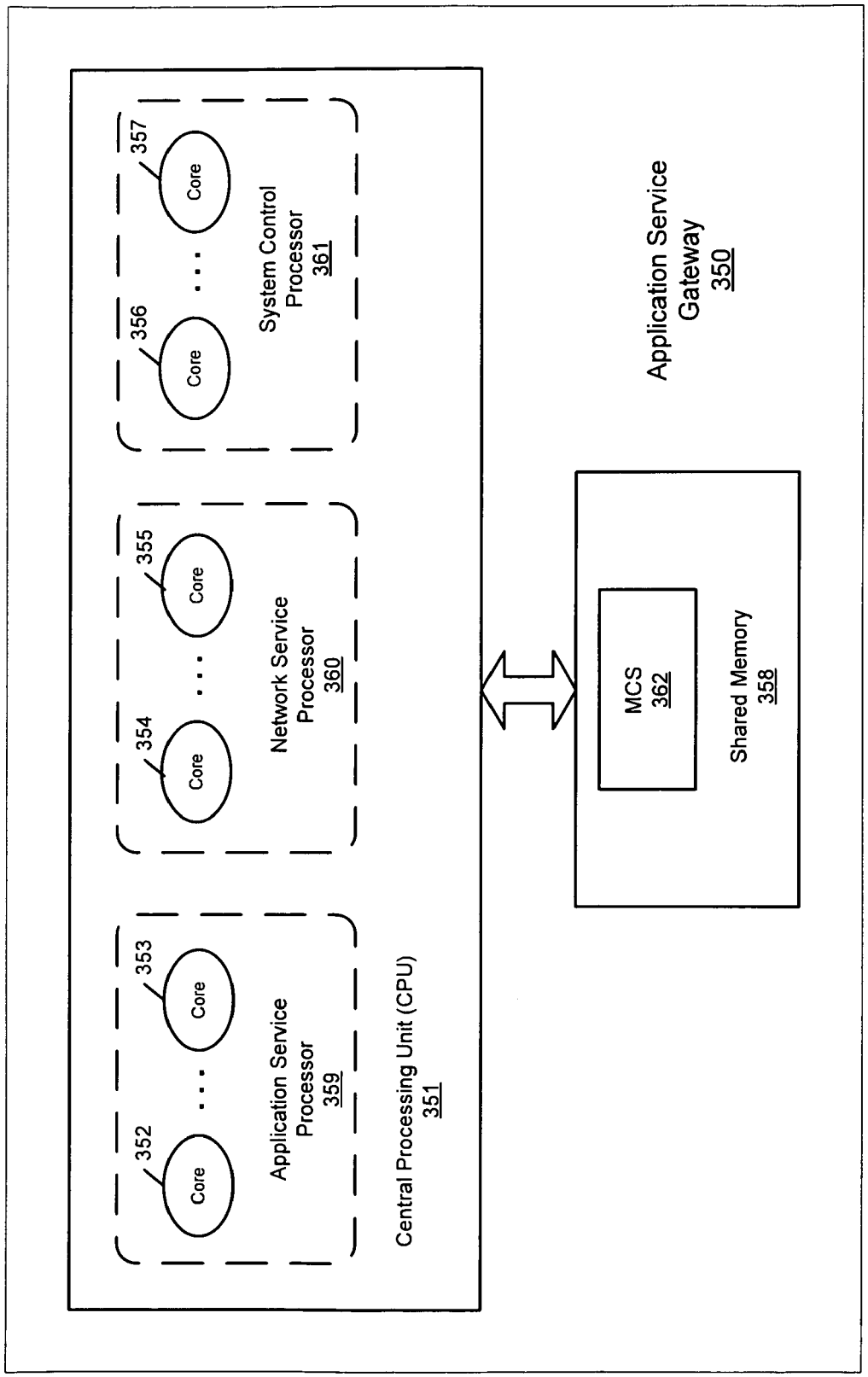

FIG. 3B is a block diagram illustrating an example of an application service appliance or gateway according to an alternative embodiment. Referring to FIG. 3B, here in this example, application service gateway or appliance 350 is implemented using a single processor 351 having multiple cores 352-357 (e.g., 16 cores). Certain portions of cores 352-357 may be logically configured or partitioned to be designated as an application service processor (ASP) as part of an ASM, a network service processor (NSP) as part of an NSM, or a system control processor (SCP) as part of an SCM described above.

In this example, as shown in FIG. 3B, cores 352-353 are logically configured as an ASP 359; cores 354-355 are logically configured as an NSP 360; and cores 356-357 are logically configured as an SCP 361. The functionalities of ASP 359, NSP 360, and SCP 361 are similar to those as shown in FIG. 3A. For example, ASP 359 may be configured to handle layer 5 to layer 7 processes while NSP 360 may be configured to handle layer 2 to layer 5 processes. Note that although a single ASP, NSP and SCP are shown; multiple ASPs, NSPs, and SCPs may also be implemented, dependent upon a specification design.

In one embodiment, ASP 359, NSP 360, and SCP 361 communicate with each other via a bus or an interconnect, as well as via shared memory 358. Shared memory 358 may be implemented as an internal memory of CPU 351, an external memory, or a combination of both internal and external memories with respect to CPU 351. Further MCS 362 is loaded and running within shared memory 358 and having the functionality similar to MCS 305 of FIG. 3A.

Figure 4:
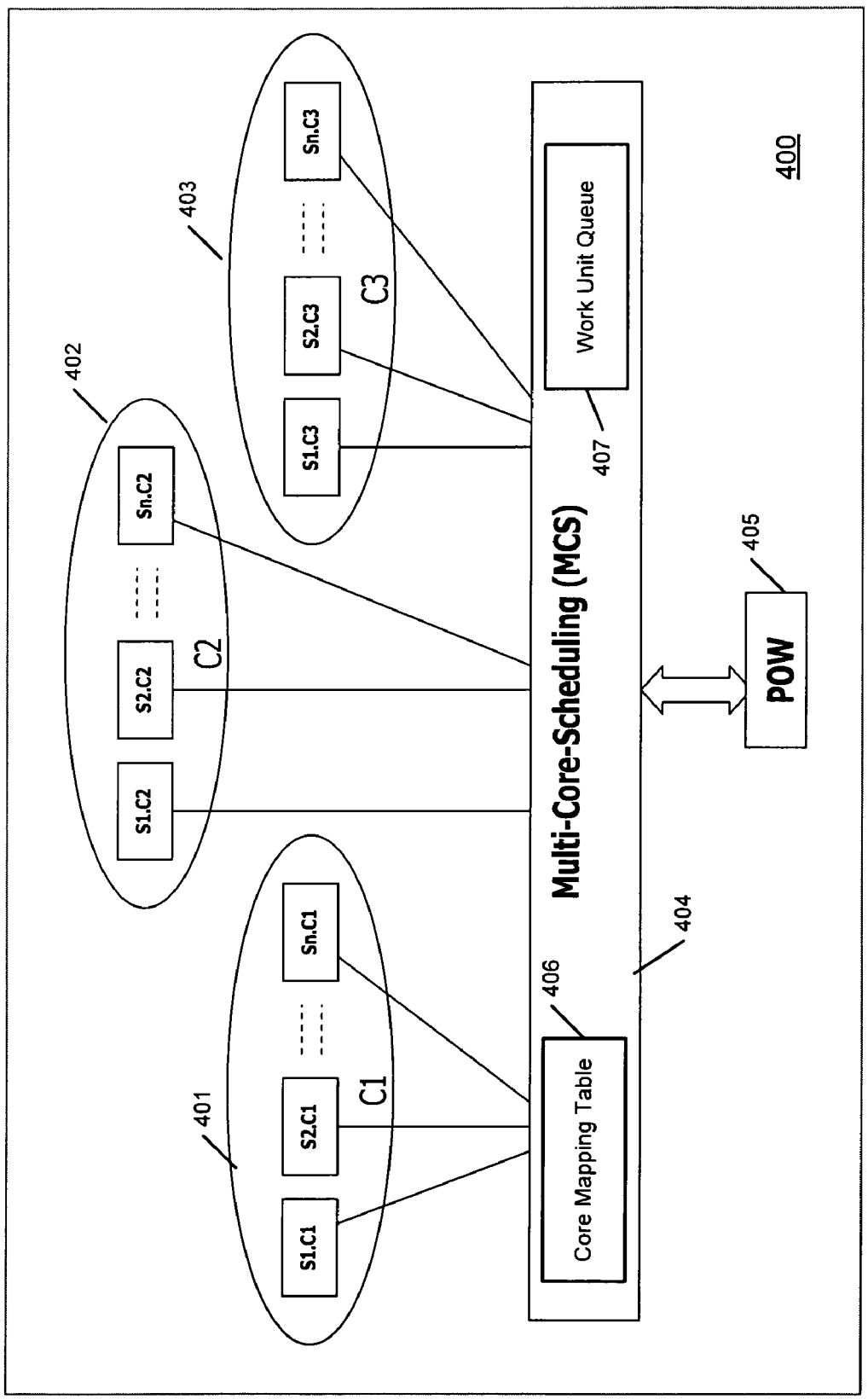
FIG. 4 is a block diagram illustrating an example of an NSM according to one embodiment of the invention.

FIG. 4 is a block diagram illustrating an example of an NSM according to one embodiment of the invention. For example, module 400 may be implemented as part of NSM 302 of FIG. 3A or NSP 359 of FIG. 3B. Referring to FIG. 4, NSM 400 includes, but is not limited to, multiple processing core logic 401-403 which can be configured to process packets in a variety of configurations (e.g., pipeline, parallel, or a combination of both, etc.) Note that for the purposes of illustration, there are only three core logic shown in FIG. 4. However, it is not so limited; any number of core logic may be implemented.

NSM 400 further includes a MCS unit 404 to schedule and dispatch work units to different cores 401-403, where the work units are constructed or categorized by packet order work (POW) unit 405. As described above, MCS 404 dispatches the work units to cores 401-403 in an efficient way such that packets of different flows can be processed substantially concurrently by multiple cores 401-403 or alternatively, packets of the same flow in different stages may be processed substantially concurrently by multiple cores 401-403.

Figure 8:
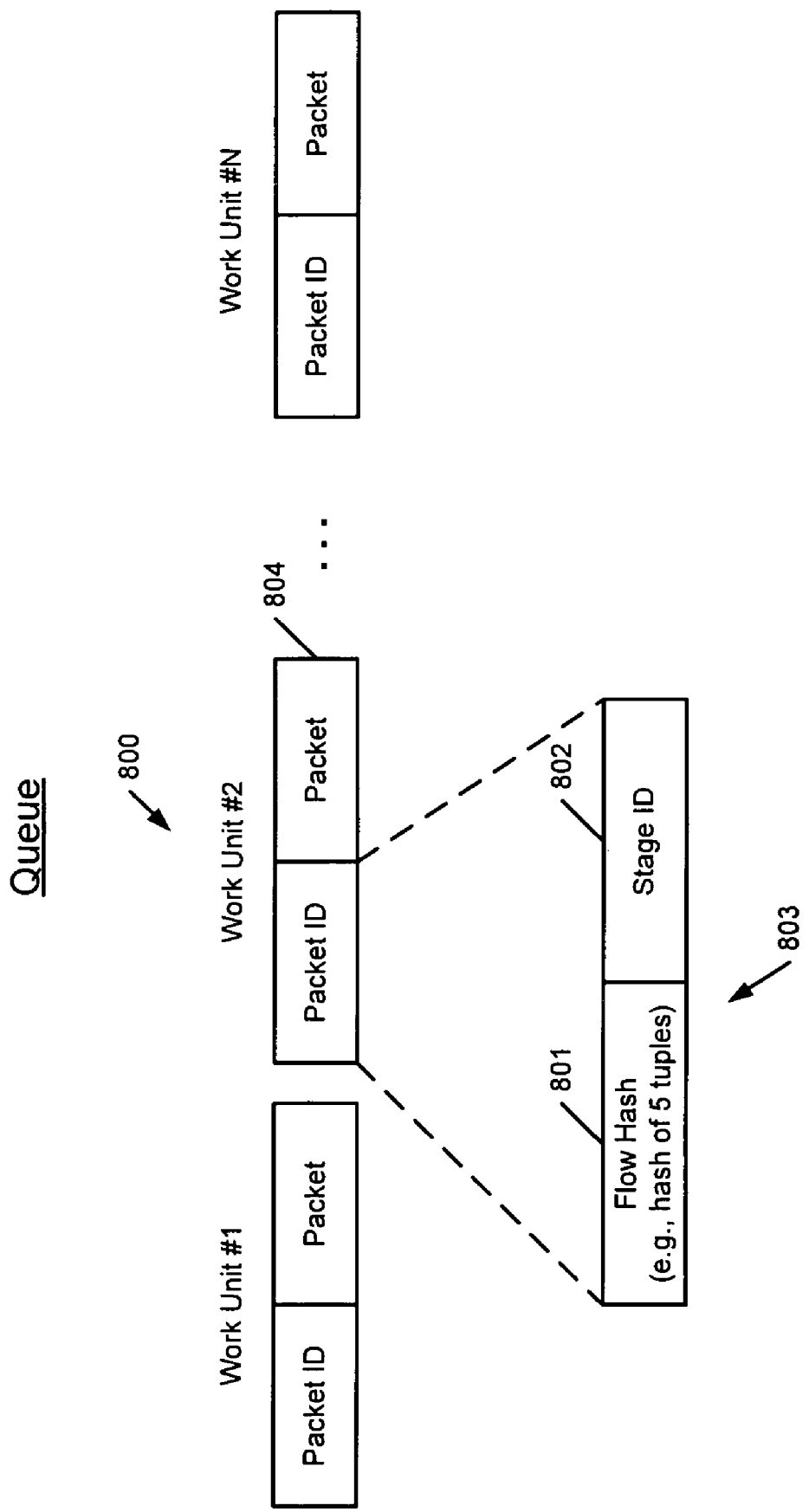
FIG. 8 is a block diagram illustrating an example of a work unit according to one embodiment.

In addition, MCS 404 further maintains a core mapping table to keep track of which of the cores 401-403 are currently processing which work units. Any work units that are not current processed by cores 402-403 may be temporarily stored in queue 407. Each work unit is identified by a work unit identifier which is associated with each packet as shown in FIG. 8, where the work unit identifier is used to identify a flow and stage that the associated packet belongs. An identifier for work unit is constructed and assigned by POW unit 405. Note that MCS 404 and POW 405 may be implemented as hardware, software, or a combination of both.

In one embodiment, cores 402-403 are implemented based on Octeon™ processor family available from Cavium Networks. In the Octeon processor, most of the hardware units perform a task based on something called work entries (e.g., work units). Work entries are essentially events which have the following characteristics:

Tag—Tag is a 32 bit value which uniquely identifies the event

Tag Type—Tag type can be of three types, ordered, atomic, or NULL.

Group—Group represents the cores which can process the given event. Every core need to indicate which groups of work entries it can handle.

When a packet comes in, input port forms a work entry (based on some configuration or policies) and can queue to the core for further processing.

POW 405 is a schedule, synchronization and ordering unit. POW acts as an arbitrator between producers and consumers in the system. All the producers in the system (e.g., input ports, cores, hardware co-processors) can queue the work entries to POW and the cores 401-403 (e.g., consumers) can ask for work whenever they are ready to process a new event.

POW 405 and/or MCS 404 will schedule the events to the cores based on tag, tag-type and group.

Based on a group value in the work entry, POW 405 and/or MCS 404 can schedule the event to an appropriate core. Tag-type and tag value control the order in which POW 405 and/or MCS 404 will schedule the events. If the tag-type is ordered, POW 405 and/or MCS 404 will not care about the tag value and it will schedule the events in the order in which they arrived. As a result, essentially two cores could be working on the ordered events which have the same tag value. If the tag-type is atomic, then POW 405 and/or MCS 404 will make sure that at any point of time only one core will be working on a given atomic tag value. This atomic tag handling of POW can help to create a software partition which can utilize all the cores efficiently.

After the scheduled atomic tag event is completely handled by the core software, it is supposed to indicate to POW 405 and/or MCS 404 so that POW 405 and/or MCS 404 can schedule another event of the same tag value.

In a particular embodiment, POW 405 and/or MCS 404 maintain only one state per core (i.e. only one work entry will be scheduled to the core at a time). If the software does not release the work entry it got before, POW 405 and/or MCS 404 will not schedule any other event to the core and this leads to the core not getting any more work. Also, if the acquired event was the atomic tag type, POW 405 and/or MCS 404 will not schedule any events for that particular tag value which will result in leakage of work entries and the stalling of that tag value events.

If the core tries to get more work before it release a previous work, it is an implicit indication to POW 405 and/or MCS 404 to release the previously held work. If the core was holding atomic tag and if it asks for more work from POW 405 and/or MCS 404 without releasing the work it is holding, POW 405 and/or MCS 404 will release the lock on the tag value and so it can schedule the events for that tag values again.

In a SMP (symmetric multi-processing) multi-core environment, a frequent scenario which requires locking is while allocating or deallocating a buffer/memory. An Octeon™ processor provides hardware free pools which can be atomically accessed from all the cores. Hardware provides atomic primitives to allocate or deallocate a buffer to the hardware pool with out involving any locking to the buffer pool.

Referring back to FIG. 4, according to one embodiment, MCS 404, which may be implemented as a software abstract layer to POW 405, is configured to utilize the different features of an Octeon™ processor. A set of APIs and the basic guidelines will be provided by MCS for application writers to easily write the applications in the multi-core environment. Idea of MCS is to ease the multi-core application development.

In one embodiment, MCS 404 provides two different scheduling models:
  Stage scheduling model—In this model application can be divided into multiple well defined stages. MCS schedules the stages efficiently. The stage scheduling and the traffic redirection can be efficiently orchestrated by using the POW unit in the Octeon.
  Flow scheduling model—In this model, MCS scheduling is based on the TCP flows. A given TCP connection is bound to a core and all the packets of the flow will be given to the same core.
Application can choose a different model depending on the functionality to be executed on the multi-core SOC.

The stage scheduling model is well suited for the applications where the entire processor is utilized for performing one fixed function. For example, the stage scheduling model can be used when the entire SOC is used for providing TCP proxy or SSL proxy functionality. In this model, all the cores run all the stages of the function processing, similar to the parallel model. MCS 404, which provides an abstraction on top of POW 405 in one embodiment, is used for communicating the events between the stages.

Every stage has the following unique characteristics.
  Unique stage-id
  POW Group to which the stage belongs to
  Callback function invoked by MCS to process the event corresponding to that stage Each stage is an independent execution entity which MCS 404 can independently schedule. A stage performs a well defined set of tasks. Typically stage performs the specified tasks for all the connections. For example, a TCP state machine could be a stage in some application. Whenever a stage is scheduled, it gets the event that contains all the required information for the stage execution. For example, when a TCP stage gets scheduled, typically the event could contain a TCP segment and the connection to which the TCP segment belongs to.

Once an event is dispatched to the stage software by MCS 404, there are at least two possible scenarios which an application can perform:
  Generate a new event to the next stage based on the processing of the current event
  If the current does not result in any new event to the next stage, consume the event completely.

For every event execution, it is the responsibility of the application software to indicate the proper disposition of the event.

Every stage uses MCS 404 for sending the events to the subsequent stages. For the purposes of illustration only, according to one embodiment, there are two data structures, mcs_event and mcs_tag, which are used for sending events from one stage to another stage. Data structure mcs_tag_t is used to indicate the details of the next stage which will receive the event and data structure mcs_event_t will have more details about the event itself.

As examples, following are the mcs_event_t and mcs_tag_t data structures.

```
typedef struct mcs_event_ {
    uchar mcs_specific[32];     /* app does not set these values */
    uchar app_specific[96];     /* MCS does not try to interpret
                                   these values */
} mcs_event_t;
typedef struct mcs_tag_ {
    int stage_id:4;             /* next stage-id */
    int tag_value:28;           /* Tag value specific to the next
                                   stage id */
} mcs_tag_t;
```

Whenever one stage finishes processing an event, it will format a new tag and a new event and send it to the next stage using MCS. Since all the stages are executing on all the cores, the event can be picked up by the next stage in any available core. Each schedulable entity is represented by the stage_id and core_id. MCS uses the POW atomic tags so that an event with a given MCS tag will not be executing in more than one core.

Referring back to FIG. 4, it is assumed that there are three packets P1, P2 for flow F1 and P3 for flow F2, and all of packets P1, P2, and P3 arrive back to back. In addition, it is assumed that each packet has to go through three stages S1, S2 and S3. There need to be 9 events which need to be handled for the three packets processing, {P1.F1.S1}, {P1.F1.S2}, {P1.F1.S3}, {P2.F1.S1} ... {P3.F2.S3}. Assuming there are three cores C1, C2, C3 (e.g., cores 401-403), the event ordering could be something like {P1.F1.S1.C1}, {P3.F2.S1.C2}, {P1.F1.S2.C1}, {P2.F1.S1.C2}, {P3.F2.S2.C3} etc. As shown by the event ordering, it is clear that all the cores will be efficiently utilized based on the {F.S} value. The notation {P.F.S.C} indicates the packet P belonging to flow F is executing stage S in core C.

Figure 5:
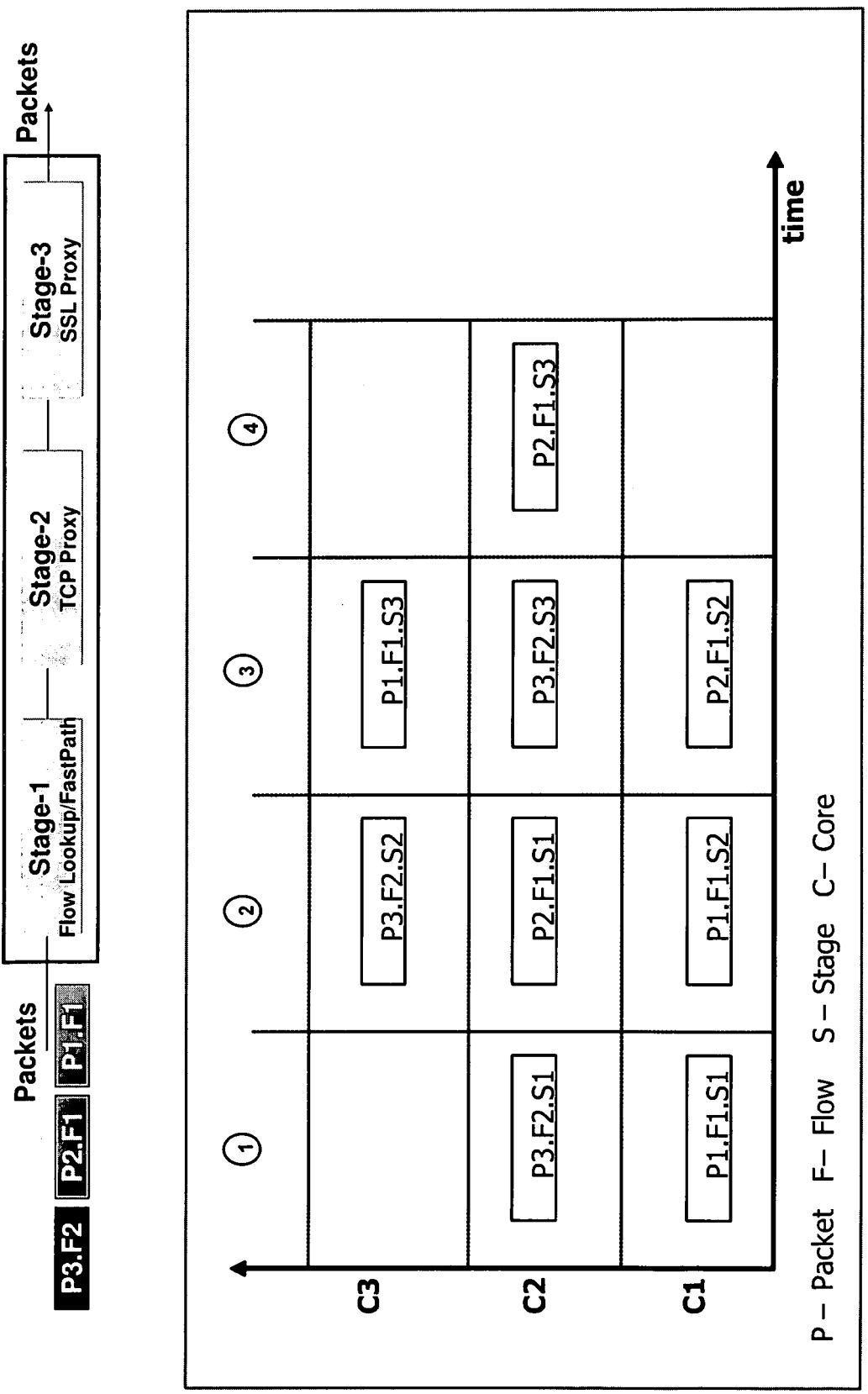
FIG. 5 is a diagram illustrating a processing timeline of multi-core multi-stage processing according to one embodiment.

The core processing timelines for the above example are shown in FIG. 5. As shown in FIG. 5, when a new event arrives, any available core with that stage processing can be utilized. As shown in FIG. 5, multiple stages are getting executed in parallel by different cores at the same time. Also, it is shown that a stage is not tied to a particular core. Whichever core is available, it can pick up the next event irrespective of the stage to which the event belongs to. As can be seen there are two levels of processing parallelism occurring herein:

Packets of different flows are getting executed in parallel on different cores

Packets of the same flow in different stages are executing in parallel by different cores The infrastructure as shown in FIGS. 4-5 provides a way to run a given stage on only few cores by mapping the appropriate POW group to the stage. This flexibility allows the application execution model to be converted from parallel model to pipeline model by configuring different stages to be run on different cores.

Figure 6:
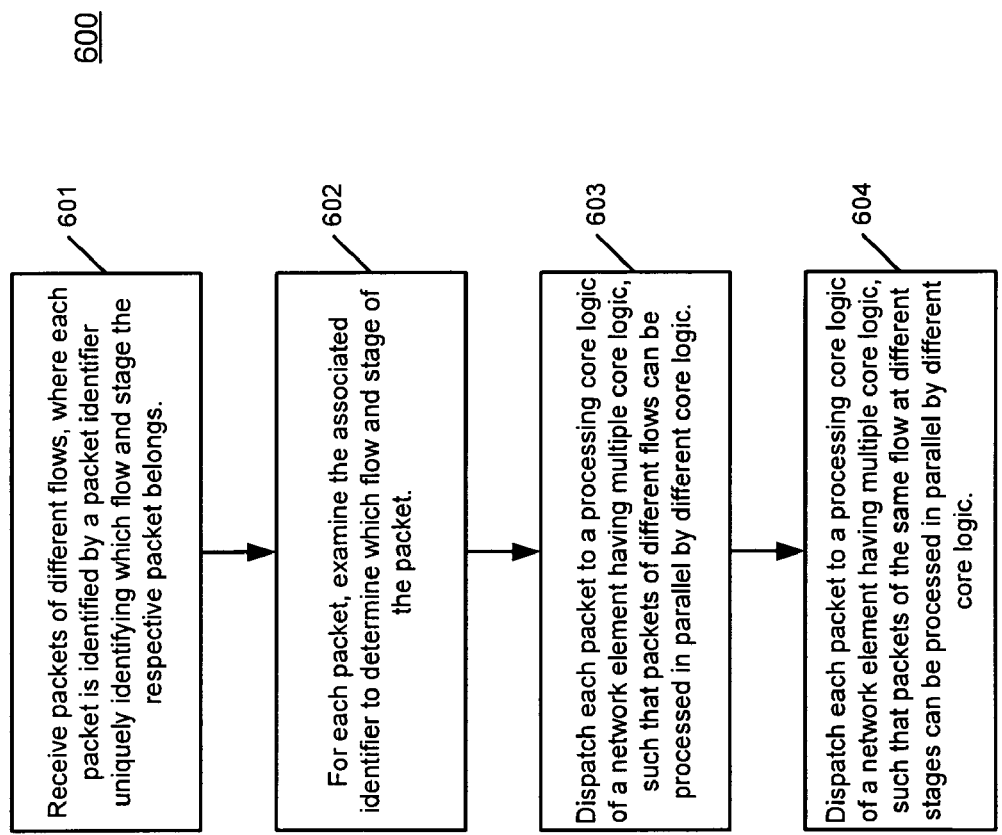
FIG. 6 is a flow diagram illustrating a process for efficiently processing packets under multi-core multi-stage processing environment according to one embodiment.

FIG. 6 is a flow diagram illustrating a process for efficiently processing packets under multi-core multi-stage processing environment according to one embodiment of the invention. Note that process 600 may be performed by processing logic which may include software, hardware, or a combination of both. For example, process 600 may be performed by MCS 404 and/or POW 405 of FIG. 4. Referring to FIG. 6, at block 601, packets of multiple flows, where each packet is identified by an identifier that uniquely identifies which flow and processing stage that the respective packet belongs. Note that a packet associated with an identifier is defined as a work unit as described above, which may be defined or configured by POW 405 of FIG. 4. The identifier herein may be referred to as a work unit identifier or packet identifier. For the purposes of illustration, a work unit and a packet are interchangeable terms herein.

At block 602, for each packet (e.g., each work unit), the associated identified is examined to determine which flow and processing stage of the packet. At block 603, the packet is dispatched to proper processing core logic such that packets of different flows can be processed or executed in parallel by different core logic. Alternatively, at block 604, the packet is dispatched to proper processing core logic such that packets of the same flow at different processing stages can be processed in parallel by different core logic.

Figure 7:
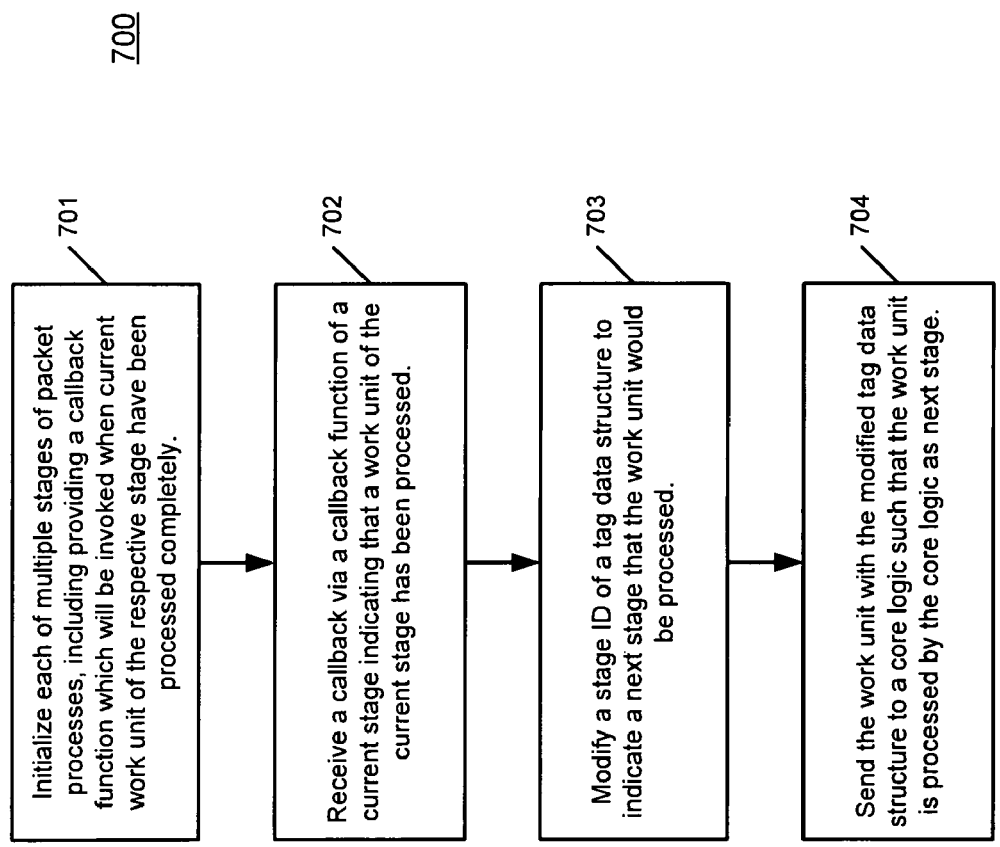
FIG. 7 is a flow diagram illustrating a process for efficiently processing packets under multi-core multi-stage processing environment according to another embodiment.

FIG. 7 is a flow diagram illustrating a process for efficiently processing packets under multi-core multi-stage processing environment according to another embodiment of the invention. Note that process 700 may be performed by processing logic which may include software, hardware, or a combination of both. For example, process 700 may be performed by MCS 404 and/or POW 405 of FIG. 4. Referring to FIG. 7, at block 701, each of the multiple processing stages of packet processing is initialized. For example, a callback function API is initialized for each stage, such that when a current work unit of the respective stage has been completely processed, the callback function is invoked for notification purposes and preparation for a next processing stage.

At block 702, during a current processing stage, a callback is received via a callback function API of the current processing stage indicating that a work unit of the current stage has been completely processed. At block 703, a stage ID of a tag data structure described above is modified to indicate a next stage in which the work unit would be processed. At block 704, the work unit is scheduled or sent to the next stage identified by the tag data structure to proper core logic. Other operations may also be performed.

FIG. 8 is a block diagram illustrating an example of a work unit according to one embodiment of the invention. Referring to FIG. 8, prior to queuing the work units in the queue (e.g., queue 407 of FIG. 4), for each packet, a work unit is created, for example, by POW 405 of FIG. 4. For example, work unit 800 includes a work unit identifier 803 associated with a packet 804. Work unit identifier 803 includes a flow identifier 801 and a stage identifier 802, where the flow ID 801 is used to identify which flow the packet 804 belongs and the stage ID 802 is used to identify which a next processing stage that the packet 804 should be processed. In one embodiment, flow ID 801 is represented as a flow hash value via a predetermined hash function on at least a portion of the packet 804. For example, flow hash 801 may be constructed by hashing five tuples of the packet 804 (e.g., source/destination IP addresses, source/destination ports, and protocol information). Stage ID 802 represents a next stage (e.g., 0, 1, ... N) in which the packet 804 will be processed.

Figure 9:
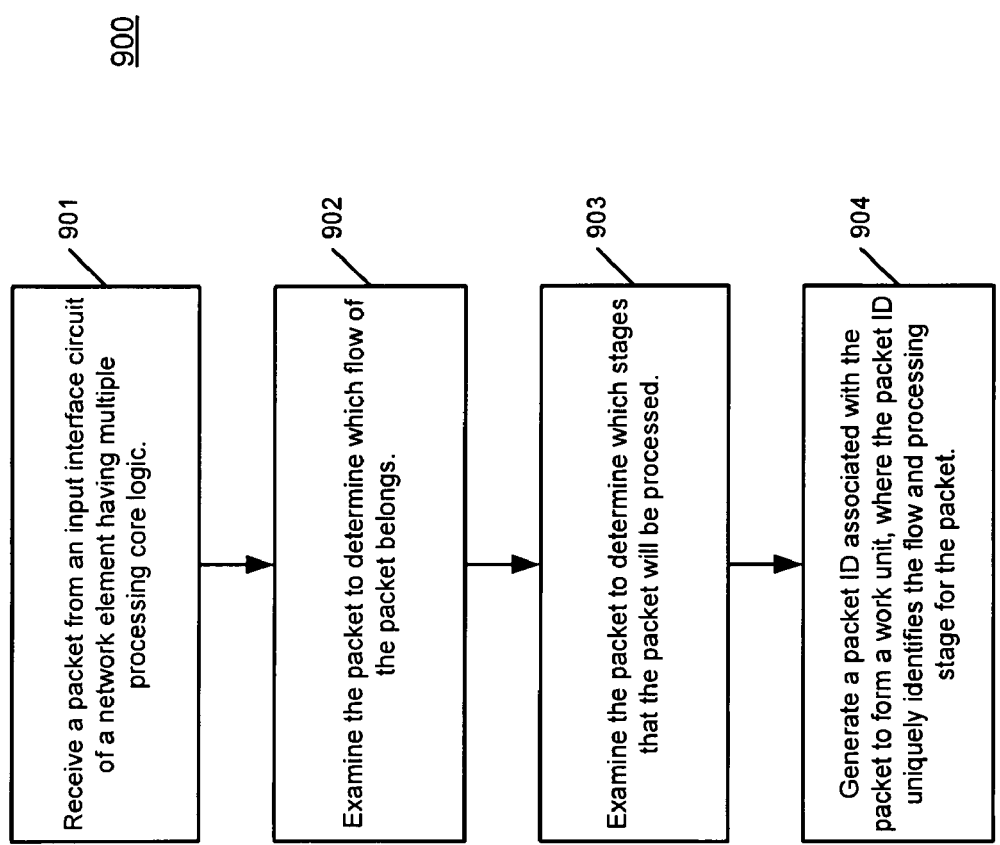
FIG. 9 is a flow diagram illustrating a process for generating a work unit according to one embodiment.

FIG. 9 is a flow diagram illustrating a process for generating a work unit according to one embodiment of the invention. Note that process 900 may be performed by processing logic which may include software, hardware, or a combination of both. For example, process 900 may be performed by MCS 404 and/or POW 405 of FIG. 4. Referring to FIG. 9, at block 901, a packet is received from an input interface circuit of an application service appliance having multiple core logic. At block 902, the packet is examined to determine which flow of the packet belongs. In addition, at block 903, the packet is examined to determine which stage that the packet will be processed. At block 904, a work unit is generated to be associated with the packet and an identifier, where the identifier uniquely identifies the flow and the processing stage of the packet, which will be used to determine how the work unit is dispatched to the core logic.

FIGS. 10A-10C are pseudo code illustrating a process performed by multi-core scheduling processes according to certain embodiments of the invention. As shown in FIG. 10A, this is a main loop that is executed by MCS which includes initialization of stage 1 (S1) and stage 2 (S2) in this example. During the initialization of S1 (e.g., init_app_s1), as shown in FIG. 10B, a callback function for S1 (e.g., app_s1_callback) is specified. Similarly, during the initialization of S2 (e.g., init_app_s2), the corresponding callback function for S2 (e.g., app_s2_callback) is specified.

When S1 process has been completed, a callback is initiated in which the callback function (e.g., app_s1_callback) for S1 is invoked with a tag data structure having detailed information of S1 and an event data structure having detailed information of the event, as shown in FIG. 10B. Thereafter, the tag data structure is modified to indicate that the next stage is S2 and the work unit is sent to S2 processing. Once S2 has been completed, as shown in FIG. 10C, the callback function for S2 (e.g., app_s2_callback) is invoked. In this example, there are only two stages and at the end of the S2 callback function, the event is de-scheduled.

Figure 11:
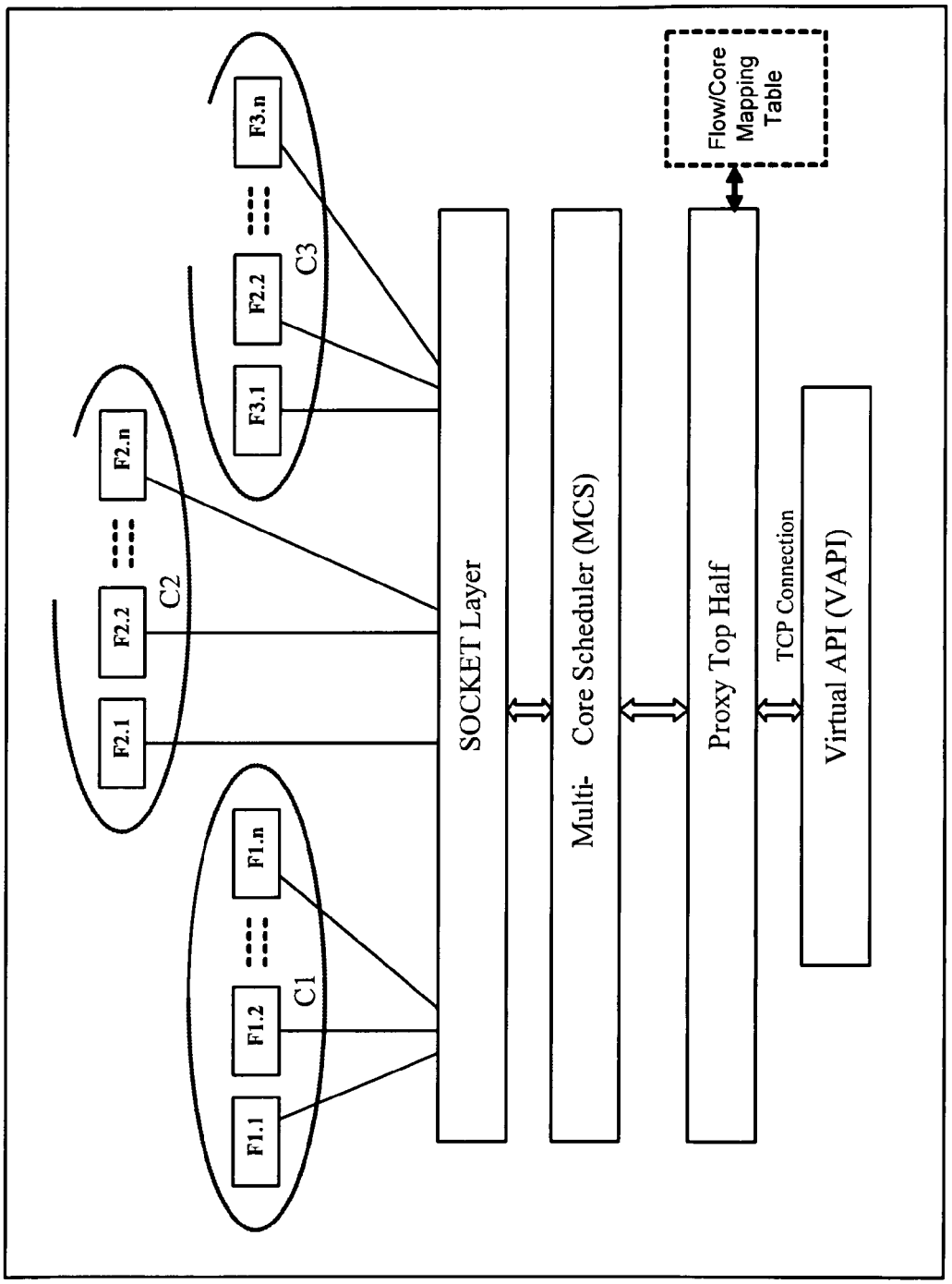
FIG. 11 is a block diagram illustrating a flow scheduling model according to one embodiment.

As described above, in addition to stage scheduling model, a flow scheduling model may also be utilized. FIG. 11 is a block diagram illustrating a flow scheduling model according to one embodiment of the invention. In this model, flows are bound to the cores and all the packets of a given flow will always be dispatched to the same core. This model is well suited for the proxy application written on top of TCP. As a result, the general guideline is that ASP (application service processor) will use the flow scheduling model. As shown in FIG. 11, MCS will have to understand the events coming from NSP to determine the connection to which the event belongs to and dispatch to the appropriate core.

Thus, techniques for multi-stage multi-core processing of network packets have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
receiving a plurality of network packets at a network element;
categorizing the network packets into a plurality of work units by a packet order work (POW) unit in the network element, each work unit representing a packet of different transport control protocol (TCP) flows to be processed in multiple processing stages in the network element, wherein each of the plurality of work units is identified by an identifier that uniquely identifies a flow in which the associated packet belongs and a processing stage that the associated packet is to be processed;
determining a group value for each of the plurality of work units, wherein the group value identifies one of a plurality of core logic in the network element for a specific processing event corresponding to a particular one of the multiple processing stages and allows the POW unit or a multi-core scheduling (MCS) unit in the network element to schedule processing of each of the work units to one of the plurality of core logic based on the specific processing event identified by the group value;
scheduling processing at the MCS unit of each of the plurality of work units based on a stage scheduling model and a flow scheduling model, wherein the stage scheduling model divides the work units into different processing stages and wherein the flow scheduling model divides the work units into different TCP flows; and
dispatching each of the work units to the one of the plurality of core logic of the network element for processing, such that work units of the network packets of different TCP flows are processed concurrently by multiple core logic and work units of the network packets of identical TCP flows in different processing stages are processed concurrently by multiple core logic, in order to determine whether the packets should be transmitted to one or more application servers of a datacenter.

2. The method of claim 1, wherein receiving comprises receiving the network packets with the network element operating as an application service gateway for the datacenter, and further comprising providing access for a client through the network element to a plurality of application servers of the datacenter that are configured to process the work units associated with the packets.

3. The method of claim 2, wherein and further comprising performing at least one of layer 5 to layer 7 services on the work units within the network element.

4. The method of claim 1, wherein categorizing comprises categorizing the network packets into work units such that the identifier for each of the work units is generated based on at least a portion of content of the packet.

5. The method of claim 4, further comprising generating the identifier for each of the work units that comprises a flow hash value representing the TCP flow associated with the packet and a stage identifier identifying a next processing stage that the packet should be processed.

6. The method of claim 5, further comprising performing a hash function on at least one of a source Internet Protocol (IP) address, destination IP address, source TCP port, destination TCP port, and protocol of the packet, in order to generate the flow hash value of the identifier.

7. The method of claim 1, further comprising for each processing stage, initializing a respective processing stage, including providing a callback function which is invoked when a work unit of the respective processing stage has been processed.

8. The method of claim 7, further comprising:
receiving a callback within a callback function of a current processing stage indicating that a particular work unit has been completely processed within the current processing stage;
modifying one or more data members of a tag data structure to indicate a next processing stage in which the particular work unit should be processed, wherein the tag data structure is passed from a caller of the callback; and
scheduling the work unit with the modified tag data structure such that the working unit can be processed in the next processing stage specified by the modified tag data structure.

9. The method of claim 1, further comprising storing any unprocessed work units in a work unit queue to be processed in a subsequent processing stage.

10. The method of claim 1, wherein categorizing the network packets into the plurality of work units comprises categorizing the network packets into the work units, wherein the work units identify processing events to be performed on the packets, and wherein determining the tag value comprises determining a multiple bit tag value that uniquely identifies a processing event.

11. The method of claim 10, further comprising:
determining a tag value and a tag type for each of the plurality of work units, wherein the tag value and tag type allow the POW unit or MCS unit to determine an order in which to process each of the plurality of work units, wherein the tag type of the work unit comprises one of an ordered tag type, atomic tag type or null tag type; and
determining a group value that represents one of the plurality of core logic which is configured to process the processing event indicated by the tag value of the work unit.

12. The method of claim 11, further comprising scheduling the processing events of the work units of the network packets in the order in which the network packets are received when the tag type is an ordered tag type and such that only one of the plurality of core logic processes only one work unit at a time when the tag type is an atomic tag type.

13. A non-transitory machine-readable storage medium having instructions stored therein which when executed by a processor, cause the processor to:
receive a plurality of network packets at a network element;
categorize the network packets into a plurality of work units in the network element, each work unit representing a packet of different transport control protocol (TCP) flows to be processed in multiple processing stages in the network element, wherein each of the plurality of work units is identified by an identifier that uniquely identifies a flow in which the associated packet belongs and a processing stage that the associated packet is to be processed;
determine a group value for each of the plurality of work units, wherein the group value identifies one of a plurality of core logic in the network element for a specific processing event corresponding to a particular one of the multiple processing stages and allows a packet order work (POW) unit or a multi-core scheduling (MCS) unit in the network element to schedule processing of each of the work units to the plurality of core logic based on the specific processing event identified by the group value;
schedule processing of each of the plurality of work units based on a stage scheduling model and a flow scheduling model, wherein the stage scheduling model divides the work units into different processing stages and wherein the flow scheduling model divides the work units into different TCP flows; and
dispatch each of the work units to one of the plurality of core logic of the network element for processing, such that work units of the network packets of different TCP flows are processed concurrently by multiple core logic and work units of the network packets of identical TCP flows with different processing stages are processed concurrently by multiple core logic, in order to determine whether the packets should be transmitted to one or more application servers of a datacenter.

14. The machine-readable storage medium of claim 13, wherein the instructions that cause the processor to receive the plurality of work units comprise instructions that cause the processor to receive the network packets with the network element operating as an application service gateway for the datacenter, and further comprises instructions that causes the processor to provide access for a client through the network element to a plurality of application servers of the datacenter that are configured to process the work units associated with the packets.

15. The machine-readable storage medium of claim 14, and further comprising instructions that cause the processor to perform at least one of layer 5 to layer 7 services on the work units within the network element.

16. The machine-readable storage medium of claim 13, wherein the instructions that cause the processor to categorize the network packets comprise instructions that cause the processor to categorize the network packets into work units such that the identifier for each of the work units is generated based on at least a portion of content of the packet.

17. The machine-readable storage medium of claim 16, further comprising instructions that cause the processor to generate the identifier for each of the work units that comprises a flow hash value representing the TCP flow associated with the packet and a stage identifier identifying a next processing stage that the packet should be processed.

18. The machine-readable storage medium of claim 17, further comprising instructions that cause the processor to perform a hash function on at least one of a source Internet Protocol (IP) address, destination IP address, source TCP port, destination TCP port, and protocol of the packet, in order to generate the flow hash value of the identifier.

19. The machine-readable storage medium of claim 13, further comprising instructions that cause the processor to initialize a respective processing stage, including providing a callback function which is invoked when a work unit of the respective processing stage has been processed.

20. The machine-readable storage medium of claim 19, further comprising instructions that cause the processor to:
receive a callback within a callback function of a current processing stage indicating that a particular work unit has been completely processed within the current processing stage;
modify one or more data members of a tag data structure to indicate a next processing stage in which the particular work unit should be processed, wherein the tag data structure is passed from a caller of the callback; and schedule the work unit with the modified tag data structure such that the working unit can be processed in the next processing stage specified by the modified tag data structure.

21. A network device, comprising:

a plurality of core logic;

a packet order work (POW) unit that is configured to categorize network packets into a plurality of work units, each work unit representing a packet of different transport control protocol (TCP) flows to be processed in multiple processing stages in the network element, wherein each of the plurality of work units is identified by an identifier that uniquely identifies a flow in which the associated packet belongs and a processing stage that the associated packet is to be processed;

a work unit queue configured to receive and store the plurality of work units; and a multi-core scheduling (MCS) unit coupled to the work unit queue that is configured to:

schedule processing of each of the plurality of work units based on a stage scheduling model and a flow scheduling model, wherein the stage scheduling model divides the work units into different processing stages and wherein the flow scheduling model divides the work units into different TCP flows, and dispatch each of the work units to one of the plurality of core logic based on a specific processing event identified by a group value of each of the work units that identifies one of a plurality of core logic for the specific processing event corresponding to a particular one of the multiple processing stages for the work units, such that work units of the network packets of different TCP flows are processed concurrently by multiple core logic and work units of the network packets of identical TCP flows with different processing stages are processed concurrently by multiple core logic, in order to determine whether the packets should be transmitted to one or more application servers of a datacenter.

22. The network device of claim 21, wherein the network device operates as an application service gateway for the datacenter and is configured to provide access for a client to a plurality of application servers of the datacenter that are configured to process the work units.

23. The network device of claim 22, wherein the MCS unit is further configured to perform at least one of layer 5 to layer 7 services on the work units.

24. The network device of claim 21, wherein the POW unit is configured to generate the identifier for each of the work units of the network packets based on at least a portion of content of the packet.

25. The network device of claim 24, wherein the identifier for the work unit comprises a flow hash value representing the TCP flow associated with the packet and a stage identifier identifying a next processing stage that the packet should be processed.

26. The network device of claim 25, wherein the MCS unit is configured to perform a hash function on at least one of a source Internet Protocol (IP) address, destination IP address, source TCP port, destination TCP port, and protocol of the packet, in order to generate the flow hash value of the identifier.

* * * * *